United States Patent
Hagl et al.

(10) Patent No.: US 7,378,951 B2
(45) Date of Patent: May 27, 2008

(54) TIRE PRESSURE MONITORING SYSTEM

(75) Inventors: Andreas Hagl, Dachau (DE); Herbert Meier, Moosburg (DE)

(73) Assignee: Texas Instruments Incorporated, Dallas, TX (US)

( * ) Notice: Subject to any disclaimer, the term of this patent is extended or adjusted under 35 U.S.C. 154(b) by 237 days.

(21) Appl. No.: 11/119,171

(22) Filed: Apr. 29, 2005

(65) Prior Publication Data

US 2005/0242939 A1    Nov. 3, 2005

(30) Foreign Application Priority Data

Apr. 30, 2004    (DE)    ................ 10 2004 021 774

(51) Int. Cl.
*B60C 23/02*    (2006.01)
*B60C 23/06*    (2006.01)

(52) U.S. Cl. ............... 340/442; 340/447; 116/34 R

(58) Field of Classification Search ........ 340/442–448; 152/152, 152.1; 73/146, 1.44, 1.57, 1.59; 116/34 R, 34 A, 34 B See application file for complete search history.

(56) References Cited

U.S. PATENT DOCUMENTS

| | | | | |
|---|---|---|---|---|
| 3,723,966 A | * | 3/1973 | Mueller et al. | ............. 340/447 |
| 4,300,120 A | * | 11/1981 | Surman | ...................... 340/447 |
| 5,463,374 A | * | 10/1995 | Mendez et al. | ............. 340/442 |
| 5,541,574 A | * | 7/1996 | Lowe et al. | ................ 340/447 |
| 6,581,449 B1 | * | 6/2003 | Brown et al. | ................ 73/146 |
| 6,710,708 B2 | * | 3/2004 | McClelland et al. | ........ 340/442 |
| 6,791,457 B2 | * | 9/2004 | Shimura | ..................... 340/448 |

FOREIGN PATENT DOCUMENTS

| | | |
|---|---|---|
| DE | 199 39 800 C2 | 9/2001 |
| DE | 697 22 336 T2 | 11/2003 |
| EP | 1 197 356 A2 | 4/2002 |
| EP | 1 211 104 A2 | 6/2002 |
| EP | 1 223 057 A2 | 7/2002 |

\* cited by examiner

*Primary Examiner*—Benjamin C. Lee
*Assistant Examiner*—Jennifer Mehmood
(74) *Attorney, Agent, or Firm*—J. Dennis Moore; W. James Brady, III; Frederick J. Telecky, Jr.

(57) ABSTRACT

A vehicular tire pressure monitoring system, including a transponder unit (10) for each tire to be monitored, the transponder unit having an incorporated RF transmitter (12) and being physically associated with the tire to be monitored. A pressure sensor for each tire to be monitored is connected to circuitry in a corresponding transponder unit. An interrogator unit (7) is associated with each transponder unit and physically mounted on a vehicle in proximity to a wheel (9) whereon a tire to be monitored is mounted. A central RF receiver (4) for all transponder units is provided. Each transponder unit is inductively coupled with an associated interrogator unit and includes an electric charge accumulation element adapted to be charged by energy inductively supplied from the associated interrogator unit in a first mode of operation, and the charge accumulation element providing a power supply to the RF transmitter of the transponder unit in a second mode of operation.

2 Claims, 2 Drawing Sheets

TIRE PRESSURE MONITORING SYSTEM

TECHNICAL FIELD OF THE INVENTION

The present invention relates to a vehicular tire pressure monitoring system.

BACKGROUND OF THE INVENTION

Conventional tire pressure monitoring systems have battery-powered RF transmitters mounted on a vehicle wheel or tire. The temperature conditions near a vehicle wheel severely affect the battery lifetime of such transmitters. An alternative to the use of battery-powered RF transmitters would be a battery-less transponder mounted in or on the wheel rim or tire. Each transponder would need an associated reader for receiving and processing data received from the transponder. Data could be exchanged between the transponder and the reader using well known transponder techniques such as LF (125 kHz, 134.2 kHz) full or half duplex, HF (13.5 MHz) full duplex or UHF backscatter. However, it would be desirable to have a tire pressure monitoring system that uses fewer components than are presently required.

SUMMARY OF THE INVENTION

The present invention provides a vehicular tire pressure monitoring system that uses battery-less transponders and a central RF receiver.

Specifically, the invention provides a vehicular tire pressure monitoring system that includes a transponder unit for each tire to be monitored, the transponder unit having an incorporated RF transmitter and being physically associated with the tire to be monitored. A pressure sensor for each tire to be monitored is connected to circuitry in a corresponding transponder unit. An interrogator unit is associated with each transponder unit and physically mounted on a vehicle in proximity to a wheel whereon a tire to be monitored is mounted. A central RF receiver is provided for all transponder units of the system. Each transponder unit is inductively coupled with an associated interrogator unit and includes an electric charge accumulation element adapted to be charged by energy inductively supplied from the associated interrogator unit in a first mode of operation. The charge accumulation element provides a power supply to the RF transmitter of the transponder unit in a second mode of operation. The function of the interrogator units is to sequentially supply energy to the associated transponder unit in the first mode of operation and permit the transponder unit in the second mode of operation to operate the RF transmitter for the transmission of data from the transponder unit to the central RF receiver in the vehicle. Processing of the data may occur in an appropriate controller associated with the central receiver. Thus, the interrogator units need no data processing capability, nor need they be wired for data transmission. Therefore, the benefits from a battery-less concept are achieved, but not at the expense of data processing capability in the interrogators, and without complex wiring. Although a sequential operation is known in the art of transponders to store energy in a capacitor in a first, energy transmission mode and use the stored energy for data transmission in a second, data exchange mode, feasibility studies show that the amount of stored energy required to operate an RF transmitter for transmission of the relevant data to a central RF receiver in a vehicle is relatively large, requiring a high storage capacity and a long charging time. For the intended application, however, long charging times are acceptable, as it is not a problem when the interval between successive tire pressure readings is as long as several seconds. Also, large storage capacitors up to several tens of µF are not a problem for the intended application, since space requirements are not critical.

In a preferred embodiment, the central RF receiver is installed in the vehicle as part of a remote control system and connected to a remote control controller provided with added functionality for processing data received from the transponder units and for driving a display device in the vehicle. For example, more and more vehicles are equipped with a keyless remote entry system that has an RF receiver. Such an existing receiver can be adapted for use in the inventive tire pressure monitoring system.

BRIEF DESCRIPTION OF THE DRAWINGS

Further advantages and features of the invention will now be described with reference to the accompanying drawings in which.

DETAILED DESCRIPTION OF THE PREFERRED EMBODIMENT

Figure 1:
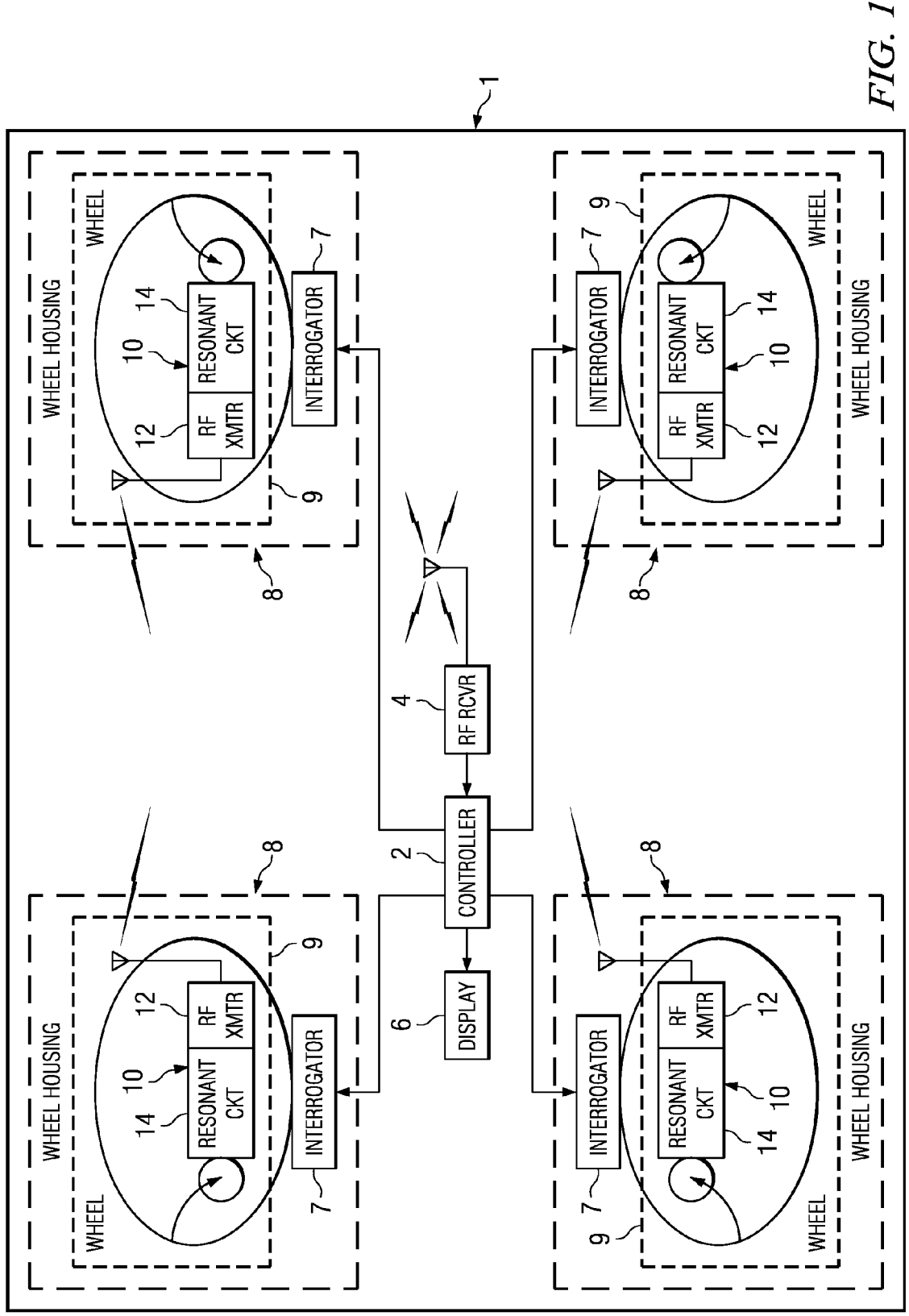
FIG. 1 shows a block diagram of the inventive vehicular tire pressure monitoring system.

The block diagram of FIG. 1 shows a complete monitoring system in a vehicle 1, with central parts in the vehicle body. Vehicle 1 is equipped with a remote keyless entry system of which a controller 2 and a central RF receiver 4 are shown. Controller 2 and RF receiver 4 are also used in the vehicular tire pressure monitoring system. The controller 2 receives an input from the central RF receiver 4. Controller 2 outputs to a display device 6 and to four interrogator units 7 mounted in four wheel housings 8 associated with four wheels 9 to be monitored. Interrogator units 7 are preferably mounted behind or integrated in a plastic protector against mud or on a liner of plastics material. In each wheel 9 is a transponder unit 10 which is physically associated with a respective tire. Transponder units 10 are mounted preferably at the rim of a wheel and are therefore reusable after tire changes. Each transponder unit 10 incorporates an RF transmitter 12 with an associated antenna and an LF resonant circuit 14 which is inductively coupled to a respective interrogator unit 7. Each interrogator 7 is connected to the central controller 2 either via a two-wire connection or via a bus system. Interrogator units 7 are used to provide power to the transponder units 10 and may also send commands and data to the transponder units.

The inventive vehicular tire pressure monitoring system is a sequential system. In a first mode of operation, power is supplied from interrogator units 7 to the transponder units via inductive coupling and in a second mode of operation, and interrogator units 7 drive their RF transmitter 12 to transmit measurement data to the central RF receiver 4.

Figure 2:
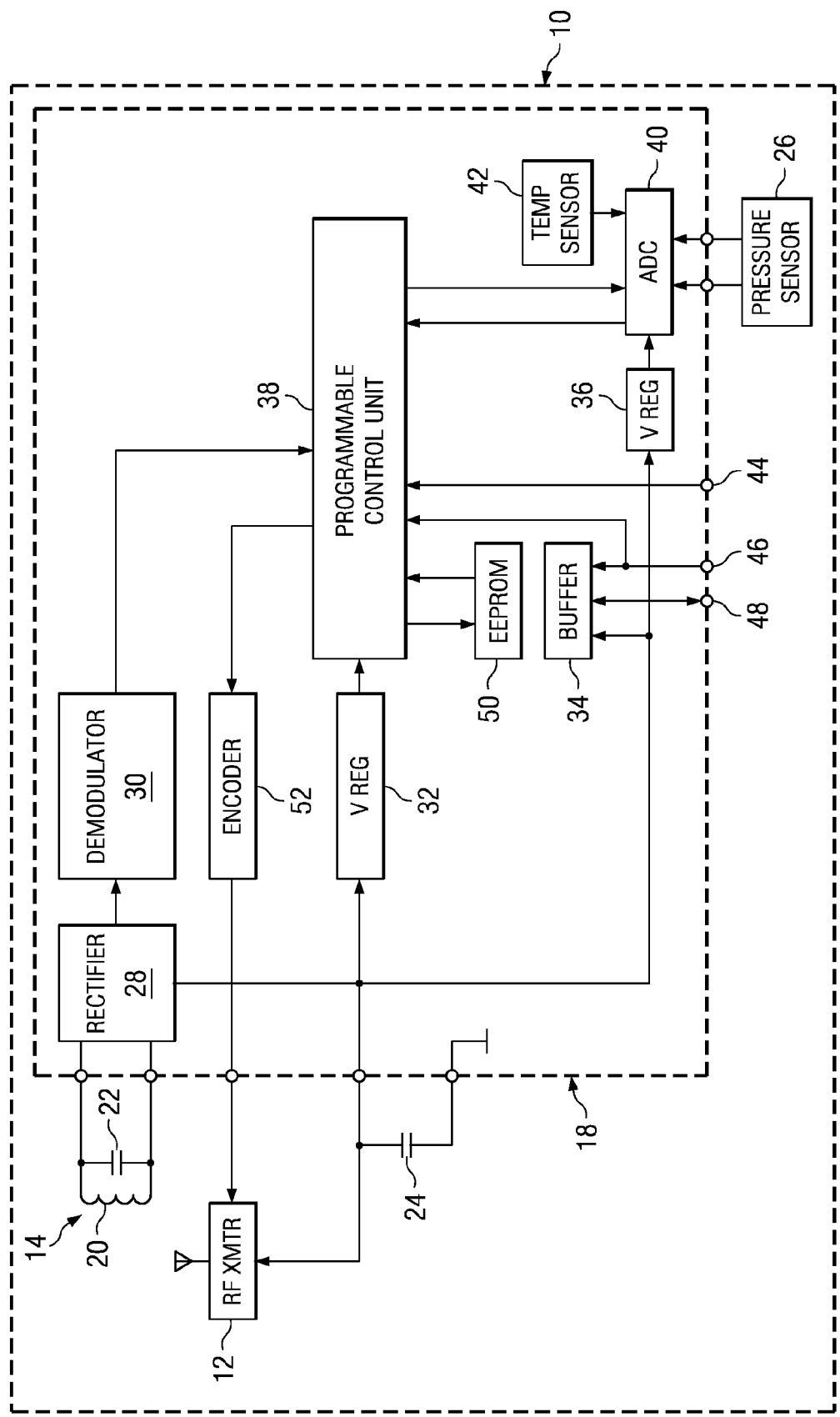
FIG. 2 shows in a block diagram the part of the monitoring system which is mounted on a vehicle wheel.

With reference to FIG. 2, the function of the transponder units will be explained in greater detail. FIG. 2 shows one transponder unit 10 of FIG. 1 more in detail. A block 18 with dashed lines delimits the part of transponder unit 10 which is integrated on an integrated circuit. Connected to this integrated circuit 18 are the RF transmitter 12, the LF resonant circuit 14, a charge accumulation capacitor 24 and a pressure sensor 26.

RF transmitter 12 is coupled to an output terminal. LF resonant circuit 14 which is formed by an inductor antenna 20 and a capacitor 22 is connected to LF input terminals of the integrated circuit 18. Capacitor 24 is connected to power terminals and is charged to provide energy to RF transmitter 12 and to the measurement circuitry. Pressure sensor 26 which measures the tire pressure is connected to analog input terminals.

The integrated circuit 18 contains circuitry for processing of the measurement data, for detecting a request from the interrogator units 7 and for control of the voltage supply.

The energy received by resonant circuit 14 is rectified by a rectifier in a rectifier block 28 on integrated circuit 18 which is connected to the resonant circuit 14 via the LF input terminals. Rectifier block 28 outputs a rectified voltage to a voltage regulator 32 as well as to the external capacitor 24 via the power terminals. Supply voltage from capacitor 24 is also delivered to a data buffer 34 and to another voltage regulator 36. Rectifier block 28 also passes the signal received at its input to an output which is connected to an input of a demodulator 30. A main component of integrated circuit 18 is a programmable control unit 38 which receives its voltage supply from voltage regulator 32. Programmable control unit 38 controls measurement of data and processes the measurement data. Demodulator 30 receives an interrogator signal from interrogator unit 7 via rectifier block 28. After demodulation demodulator 30 outputs an initiation signal to programmable control unit 38. Programmable control unit 38 has an output connected to an input of an analog-to-digital converter 40 which has two other inputs connected to the pressure sensor 26 via the analog input terminals. A temperature sensor 42 which is integrated on the integrated circuit 18 has an output connected to a further input of analog digital-to-converter 40. Analog-to-digital converter 40 outputs the converted measurement data to an input of programmable control unit 38. Programmable control unit 38 receives a clock via a clock terminal 44. Via an enable terminal 46 programmable control unit 38 can be enabled. This enable terminal is also connected to the data buffer 34. Program data can be loaded to programmable control unit 38 from a data input terminal 48 via the data buffer 34; an EEPROM 50 is also provided and connected to programmable control unit 38. EEPROM 50 and data buffer 34 are used to load program data to programmable control unit 38 and for adapting e.g. the sensor curve to the actually used pressure sensor. Programmable control unit 38 has an output connected to an input of an encoder 52. After processing of the measurement data, programmable control unit 38 outputs the data to be sent to encoder 52. Encoder 52 has an output connected to an input of RF transmitter 12 via an output terminal of integrated circuit 18. Encoder 52 encodes the data and outputs the encoded data to RF transmitter 12. The code to be used can be a Manchester Code.

In a first mode of operation which can last several seconds, capacitor 24 is charged. Interrogator unit 7 includes an LF transmitter which operates at an LF frequency of 125 kHz or 134.2 kHz. The LF transmitter sends an electromagnetic wave with the LF frequency. Resonant circuit 14 is tuned to this LF frequency and receives energy each time transponder unit 10, which turns with the wheel, passes in front of interrogator unit 7 which is mounted in wheel housing 8. The energy received by resonant circuit 14 and rectified by the rectifier in rectifier block 28 is then stored in capacitor 24. For permitting effective energy transfer, interrogator units 7 each include an antenna that extends along a major part of the peripheral extension of a liner of plastic material with respect to vehicle rotation. Capacitor 24 has a capacity in a range of several µF to several tens of µF to allow sufficient storage of energy.

In a second mode of operation, interrogator unit 7 sends a request for the transmission of measurement data. During this mode of operation which lasts only several milliseconds, energy is supplied from capacitor 24 to RF transmitter 12. The measurement request is demodulated by demodulator unit 30 and output to programmable control unit 38. Programmable control unit 38 then takes temperature and pressure measurement data from analog-to-digital converter 40. The obtained measurement data is processed in programmable control unit 38 and sent to encoder 52. Encoder 52 encodes the received data and outputs them via the output terminal to RF transmitter 12 which sends a response telegram. Presuming a telegram length of 64 bits at a bit rate of 9.6 kbits/s, transmission of the measurement data to central receiver 4 lasts only several milliseconds. When the response telegram with the measurement data has been sent by RF transmitter 12, the second mode of operation ends and the first mode of operation is resumed.

As an alternative to the interrogator 7 sending a request to the transponder unit 10 at the end of a charging period, the transponder unit 10 may detect a full charge of capacitor 24 and switch to the transmit mode when a predetermined charge voltage is reached.

The LF transmitter in each interrogator 7 may operate continuously. As a further alternative, the LF transmitters operate discontinuously, and termination of each LF transmission period is detected by the associated transponder units to cause automatic switching to the data transmit mode.

Although the present invention and its advantages have been described in detail, it should be understood that various changes, substitutions and alterations can be made herein without departing from the spirit and scope of the invention as defined by the appended claims.

The invention claimed is:

1. A vehicular tire pressure monitoring system comprising:
    a transponder unit for each tire to be monitored, the transponder unit having an incorporated RF transmitter and being physically associated with the tire to be monitored;
    a pressure sensor for each tire to be monitored and connected to circuitry in a corresponding transponder unit;
    an interrogator unit associated with each transponder unit and physically mounted on a vehicle in proximity to a wheel whereon a tire to be monitored is mounted; and
    a central RF receiver for all transponder units; wherein each transponder unit is inductively coupled with an associated interrogator unit and includes an electric charge accumulation element adapted to be charged by energy inductively supplied from the associated interrogator unit in a first mode of operation, and the charge accumulation element providing a power supply to the RF transmitter of the transponder unit in a second mode of operation, wherein the interrogator units are mounted in respective wheel housings of the vehicle and the charge accumulation elements are charged during rotation of respective wheels, and, wherein the interrogator units are mounted on a liner of plastics material and include an antenna that extends along a major part of the peripheral extension of the liner with respect to vehicle rotation.

2. A vehicular tire pressure monitoring system comprising:
- a transponder unit for each tire to be monitored, the transponder unit having an incorporated RF transmitter and being physically associated with the tire to be monitored;
- a pressure sensor for each tire to be monitored and connected to circuitry in a corresponding transponder unit;
- an interrogator unit associated with each transponder unit and physically mounted on a vehicle in proximity to a wheel whereon a tire to be monitored is mounted; and
- a central RF receiver for all transponder units; wherein each transponder unit is inductively coupled with an associated interrogator unit and includes an electric charge accumulation element adapted to be charged by energy inductively supplied from the associated interrogator unit in a first mode of operation, and the charge accumulation element providing a power supply to the RF transmitter of the transponder unit in a second mode of operation, wherein each transponder unit includes a) an integrated circuit with
- a programmable control unit,
- a rectifier connected to LF input terminals and having an output,
- a power terminal connected to the output of the rectifier,
- at least one analog input terminal for a pressure sensor, and
- an encoder with an input connected to an output of the programmable control unit and an output connected to an output terminal of the integrated circuit;

b) a resonant circuit with an inductor antenna and a capacitor, connected to the LF input terminals of the integrated circuit;

c) a charge accumulation capacitor connected to the power terminal of the integrated circuit; and d) an RF transmitter with a signal input coupled to the output terminal of the integrated circuit, a supply input connected to the charge accumulation capacitor and an output connected to an antenna.

* * * * *